United States Patent
Niki

(10) Patent No.: US 8,675,526 B2
(45) Date of Patent: Mar. 18, 2014

(54) WIRELESS COMMUNICATION SYSTEM, BASE STATION, CHANNEL ALLOCATION METHOD, AND PROGRAM

(75) Inventor: Takeo Niki, Tokyo (JP)

(73) Assignee: NEC Corporation, Tokyo (JP)

(*) Notice: Subject to any disclaimer, the term of this patent is extended or adjusted under 35 U.S.C. 154(b) by 509 days.

(21) Appl. No.: 12/991,785

(22) PCT Filed: May 11, 2009

(86) PCT No.: PCT/JP2009/058763
§ 371 (c)(1),
(2), (4) Date: Nov. 9, 2010

(87) PCT Pub. No.: WO2009/157257
PCT Pub. Date: Dec. 30, 2009

(65) Prior Publication Data
US 2011/0058507 A1    Mar. 10, 2011

(30) Foreign Application Priority Data

Jun. 26, 2008    (JP) ................... 2008-167335

(51) Int. Cl.
*H04J 3/00* (2006.01)
*H04W 72/00* (2009.01)

(52) U.S. Cl.
USPC .................... 370/280; 370/329; 455/450

(58) Field of Classification Search
USPC ................................................ 370/915
See application file for complete search history.

(56) References Cited

U.S. PATENT DOCUMENTS

| | | | | |
|---|---|---|---|---|
| 6,714,528 B1* | 3/2004 | Moon et al. | | 370/342 |
| 7,715,846 B2* | 5/2010 | Ji et al. | | 455/447 |
| 8,325,701 B2* | 12/2012 | Yamauchi et al. | | 370/343 |
| 2006/0009224 A1* | 1/2006 | Lim et al. | | 455/442 |
| 2006/0291371 A1* | 12/2006 | Sutivong et al. | | 370/208 |
| 2007/0213069 A1* | 9/2007 | Ji et al. | | 455/450 |
| 2008/0220790 A1* | 9/2008 | Cai et al. | | 455/450 |
| 2010/0016023 A1* | 1/2010 | Yamauchi et al. | | 455/562.1 |
| 2010/0046446 A1* | 2/2010 | Tanigawa et al. | | 370/329 |
| 2010/0074217 A1* | 3/2010 | Kim et al. | | 370/330 |

FOREIGN PATENT DOCUMENTS

| | | | |
|---|---|---|---|
| JP | 2007335913 A | | 12/2007 |
| JP | 2008072285 A | * | 3/2008 |
| WO | 2008029686 A | | 3/2008 |
| WO | 2008066214 A | | 6/2008 |

OTHER PUBLICATIONS

KDDI R & D Laboratories Inc (Japanese Pub No. 2007-335913 published Dec. 27, 2007).*
Yamauchi ("Radio Communication System and Radio Communication Method"—WIPO Publication WO 2008/029686 published Mar. 13, 2008) Translated publication.*

(Continued)

*Primary Examiner* — Andrew Lai
*Assistant Examiner* — Mario Malcolm
(74) *Attorney, Agent, or Firm* — Sughrue Mion, PLLC

(57) ABSTRACT

A wireless communication system includes a terminal and a base station for forming a plurality of sectors and receiving an uplink subframe from said terminal positioned in any of said plurality of sectors, according to an OFDMA/TDD scheme. Here, in said uplink subframe, said base station allocates a predetermined subchannel among subchannels usable by said base station to two predetermined sectors among said plurality of sectors in said uplink subframe, according to time division.

6 Claims, 6 Drawing Sheets

(56) References Cited

OTHER PUBLICATIONS

Yamauchi ("Radio Communication System and Radio Communication Method"—WIPO Publication WO 2008/029686 published Mar. 13, 2008) Web Page.*

Takahisa et al ("Radio Communication System and Radio Communication Method" WO2008029686 published on Mar. 13, 2008).*
Japanese Office Action for JP2008-167335 issued Oct. 27, 2010.
International Search Report for PCT/JP2009/058763 mailed Jul. 14, 2009.

* cited by examiner

· In case of 5MHz 1 channel is insufficient

· UL control channels

WIRELESS COMMUNICATION SYSTEM, BASE STATION, CHANNEL ALLOCATION METHOD, AND PROGRAM

The present application is the National Phase of PCT/JP2009/058763, filed May 11, 2009, which claims the benefit of Japanese patent application No. 2008-167335 filed on Jun. 26, 2008, the entire disclosure of which is incorporated herein.

TECHNICAL FIELD

The present invention relates to a wireless communication system, a base station, a channel allocation method, and a program.

BACKGROUND ART

In wireless communication systems according to WiMAX (Worldwide Interoperability for Microwave Access), data is received and transmitted in units of subframes.

Further, in the wireless communication system according to WiMAX, an OFDMA (Orthogonal Frequency Division Multiple Access) scheme is adopted for multiple access schemes, and a TDD (Time Division Duplex) scheme is adopted for duplex schemes.

The OFDMA scheme is a scheme in which the direction of frequency is divided by subcarriers, the direction of time is divided by time slots and data to be transmitted is allocated a subcarrier and a time slot in which that subcarrier can be used.

The TDD scheme is a scheme in which the same frequency is used for the uplink and the downlink, and uplink subframes and downlink subframes are changed on the time axis.

Furthermore, in the wireless communication system according to WiMAX, individual base stations sometimes form a sector configuration in which a cell is divided into a plurality of sectors by providing directivity for a transmitting antenna in order to increase the number of terminals (Mobile Stations) that can simultaneously communicate with each other.

Here, an exemplary frame structure of an uplink subframe when each base station constructs a three-sector configuration in a wireless communication system according to WiMAX (see FIG. 1) will be described with reference to FIG. 2. In addition, in FIG. 2, suppose that each base station is allocated a 10-MHz bandwidth or 7-MHz bandwidth for a frequency bandwidth.

As shown in FIG. 2, when each base station is allocated a 10-MHz bandwidth or 7-MHz bandwidth, it can use 35 subchannels, each of which has a plurality of subcarriers combined. In this case, each base station distributes and allocates 35 subchannels to individual segments #0, #1, and #2 corresponding to sectors #0, #1, and #2, respectively, in the uplink subframe in order to reduce interference between the sectors (for example, see Patent Literature 1).

For each of segments #0, #1, and #2, the subchannel allocated to each segment is assigned as UL control channels for uplink (UL) control, and then assigned as data channels for uplink data transmission.

The UL control channels include ranging channels used for ranging to adjust the transmission timing, transmission frequency, and transmission electric power at a terminal. More specifically, the ranging channels are formed of an initial/HO ranging channel used for initial and handover (HO) and a periodic ranging/BW request channel used for periodic ranging and bandwidth requesting at regular time intervals. In addition, at least six subchannels are necessary for the ranging channels.

Further, the UL control channels also include a CQICH (Channel Quality Indicator Channel) and an ACK/NACK channel for ACK (Acknowledgment)/NACK (Negative ACK). In addition, both the CQICH and the ACK/NACK channel have variable-length subchannels.

CITATION LIST

Patent Literature

Patent Literature 1 is JP2007-335913A.

SUMMARY OF THE INVENTION

Problem to be Solved by the Invention

Now, in the wireless communication system according to WiMAX, each base station is sometimes allocated a 5-MHz bandwidth as a frequency bandwidth.

In this case, although each base station can use 17 subchannels, it is necessary to reserve at least six subchannels designated for the ranging region as described above.

Consequently, as shown in FIG. 3, for example, when each base station constructs the three-sector configuration, there is a problem in which the total of 18 subchannels for the ranging regions of three sectors is insufficient by one channel. Furthermore, similarly, when each base station constructs a configuration having three or more sectors, there is also a problem in which subchannels are insufficient.

Therefore, an object of the present invention is to provide a wireless communication system, a base station, a channel allocation method, and a program, which solve the problems described above.

Means for Solving the Problems

A wireless communication system according to the present invention is a wireless communication system including: a terminal; and a base station for forming a plurality of sectors and receiving an uplink subframe from said terminal positioned in any of said plurality of sectors, according to an OFDMA/TDD scheme, wherein in said uplink subframe, said base station allocates a predetermined subchannel among subchannels usable by said base station to two predetermined sectors among said plurality of sectors, according to time division.

A base station according to the present invention is a base station for forming a plurality of sectors and receiving an uplink subframe from a terminal positioned in any of said plurality of sectors according to an OFDMA/TDD scheme, the base station including: a control unit for allocating a predetermined subchannel among subchannels usable by said base station to two predetermined sectors among said plurality of sectors in said uplink subframe, according to time division.

A channel allocation method according to the present invention is a channel allocation method performed by a base station for forming a plurality of sectors and receiving an uplink subframe from a terminal positioned in any of said plurality of sectors according to an OFDMA/TDD scheme, the method including the step of allocating a predetermined subchannel among subchannels usable by said base station to two predetermined sectors among said plurality of sectors in said uplink subframe, according to time division.

A program according to the present invention is a program for allowing a base station, that is to form a plurality of sectors and to receive an uplink subframe from a terminal positioned in any of said plurality of sectors according to an OFDMA/TDD scheme, to perform an allocation procedure for allocating a predetermined subchannel among subchannels usable by said base station to two predetermined sectors among said plurality of sectors in said uplink subframe, according to time division.

Advantage of the Invention

According to the present invention, in the uplink subframe, the base station allocates a predetermined subchannel among subchannels usable by this base station to two predetermined sectors, according to time division.

As described above, such advantages can be obtained in which the problem of subchannel insufficiency can be avoided by allowing two sectors to use the same subchannel, and that the occurrence of interference between these two sectors can also be suppressed by varying the time periods during which the same subchannel will be used.

MODE FOR CARRYING OUT THE INVENTION

In the following, the best mode for carrying out the present invention will be described with reference to the drawings.

In addition, in an embodiment described below, a wireless communication system according to WiMAX is taken and described as an example. However, the present invention is not limited to WiMAX, and is applicable to general wireless communication systems, which adopt the OFDMA/TDD scheme.

Figure 4:
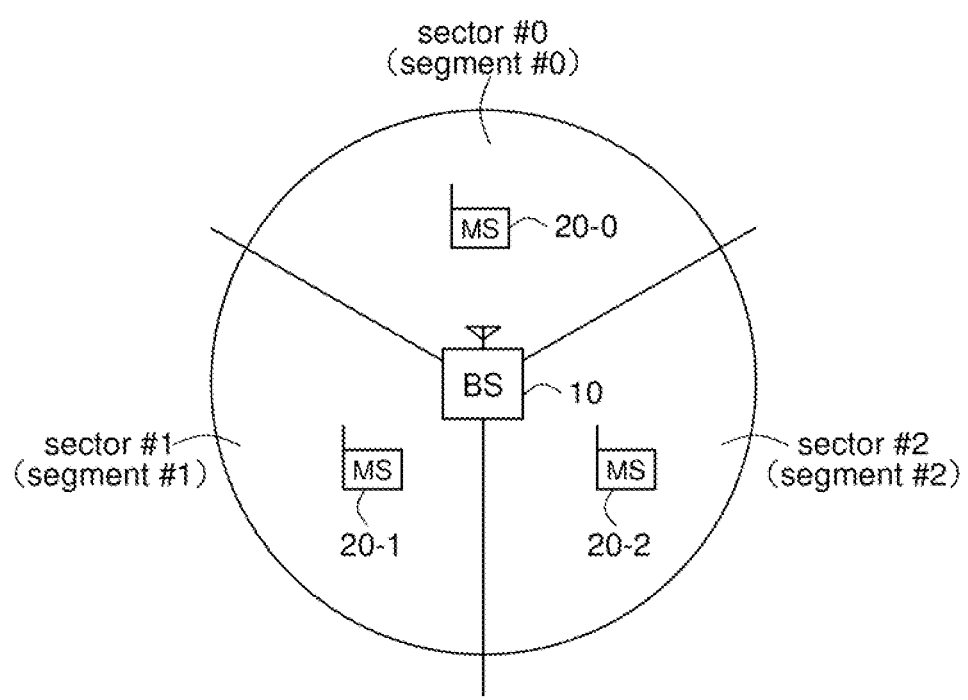
FIG. 4 is a diagram depicting the configuration of a wireless communication system according to an embodiment of the present invention.

As shown in FIG. 4, a wireless communication system according to this embodiment includes base station 10 that forms three sectors #0, #1, and #2 by partitioning a cell, and terminals 20-0, 20-1, and 20-2 that are positioned in sectors #0, #1, and #2, respectively. Subframes are received and sent between base station 10 and terminals 20-0, 20-1, and 20-2, according to an OFDMA/TDD scheme.

In addition, in FIG. 4, for simplified explanation, one base station 10 and three terminals 20-0, 20-1, and 20-2 are only shown, and the other base stations and terminals are omitted.

Also, although base station 10 has a three-sector configuration, configurations having three sectors or more may be constructed.

Figure 5:
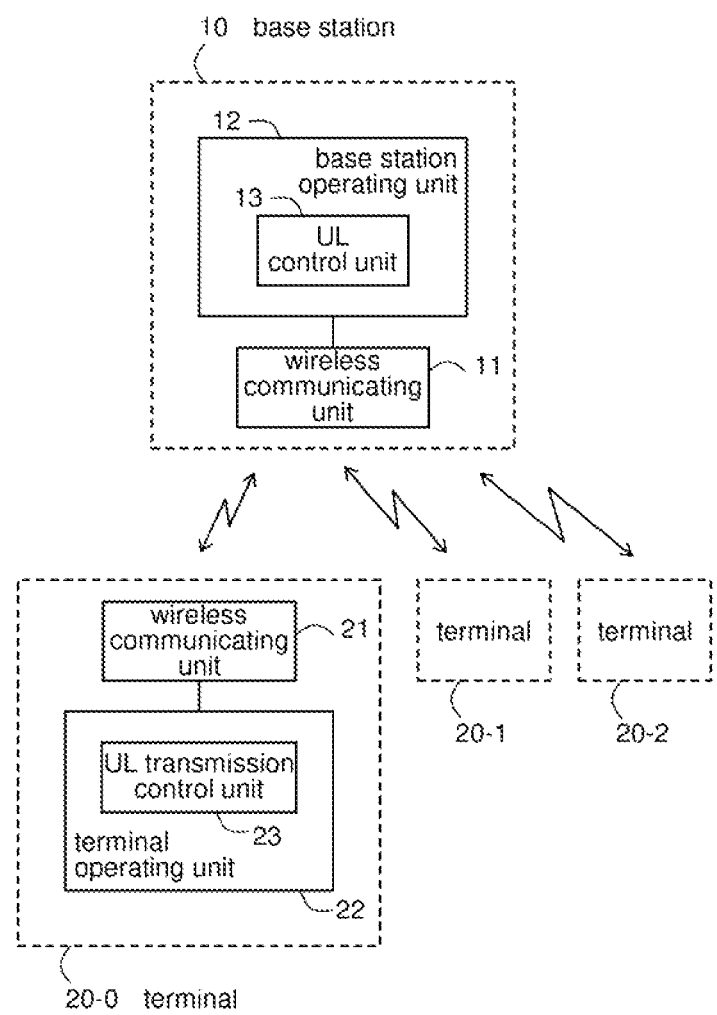
FIG. 5 is a block diagram depicting the configurations of a base station and terminals shown in FIG. 4.

As shown in FIG. 5, base station 10 has wireless communicating unit 11 and base station operating unit 12.

Wireless communicating unit 11 communicates with terminals 20-0, 20-1, and 20-2 in a wireless manner.

Base station operating unit 12 has UL control unit 13 that allocates subchannels usable by this base station to segments #0, #1, and #2 corresponding to sectors #0, #1, and #2, respectively, in an uplink subframe. The resulting allocation is sent to terminals 20-0, 20-1, and 20-2 by wireless communicating unit 11.

In addition to this, base station operating unit 12 has components that achieve functionality equivalent to that of base stations generally used in the wireless communication system according to WiMAX. However, these components are well-known, and the drawing and description thereof are omitted.

Further, as shown in FIG. 5, terminal 20-0 has wireless communicating unit 21 and terminal operating unit 22. In addition, other terminals 20-1 and 20-2 also have a configuration similar to that of terminal 20-0.

Wireless communicating unit 21 communicates with base station 10 in a wireless manner.

Terminal operating unit 22 has UL transmission control unit 23 that controls the transmission of an uplink subframe to base station 10 using the subchannels allocated by base station 10.

Additionally, terminal operating unit 22 has components that achieve functionality equivalent to that of terminals generally used in the wireless communication system according to WiMAX. However, these components are well-known, and the drawing and description thereof are omitted.

In the following, a channel allocation operation will be described when base station 10 is allocated a 5-MHz bandwidth for a frequency bandwidth.

As discussed above, base station 10 having a three-sector configuration needs to reserve at least six subchannels for the ranging region of each of three segments #0, #1, and #2.

Figure 1:
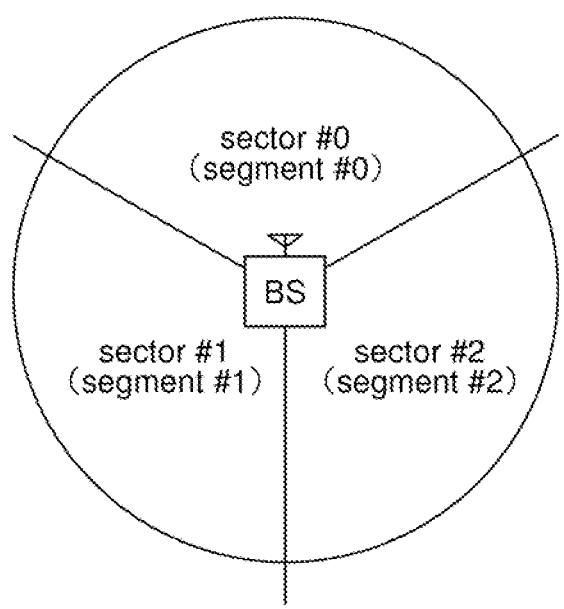
FIG. 1 is a diagram illustrative of a base station having a three-sector configuration.
Figure 2:
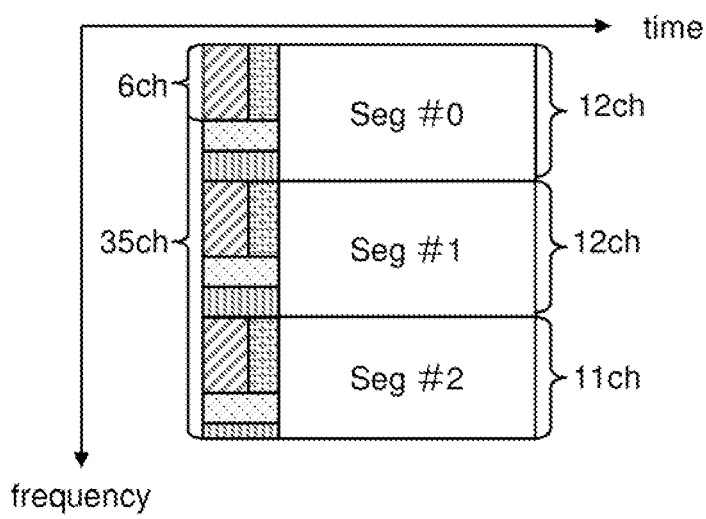
FIG. 2 is a diagram illustrative of a frame structure for a typical uplink subframe when a base station having a three-sector configuration is allocated a frequency bandwidth of 10 MHz or 7 MHz.
Figure 2:
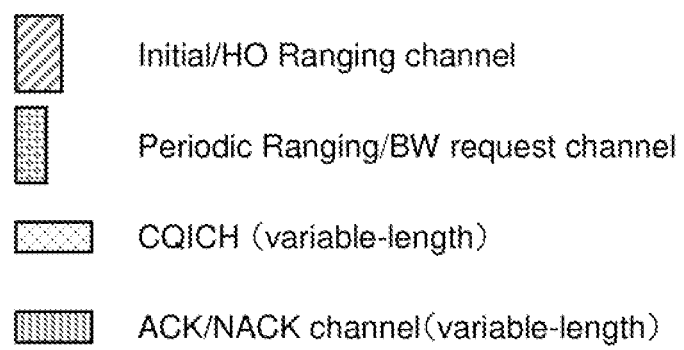
Figure 3:
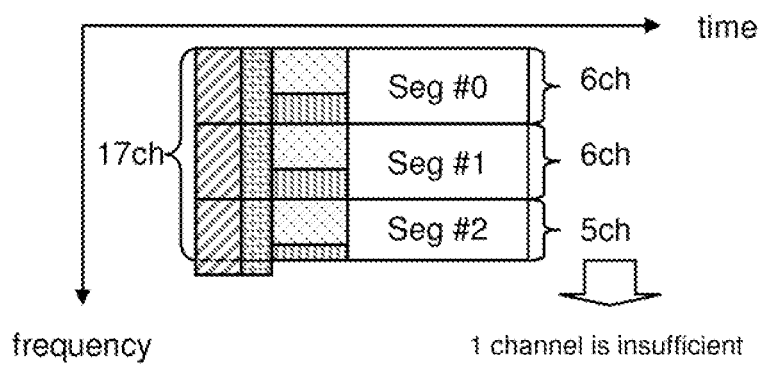
FIG. 3 is a diagram illustrative of a frame structure for a typical uplink subframe when a base station having a three-sector configuration is allocated a frequency bandwidth of 5 MHz.
Figure 3:
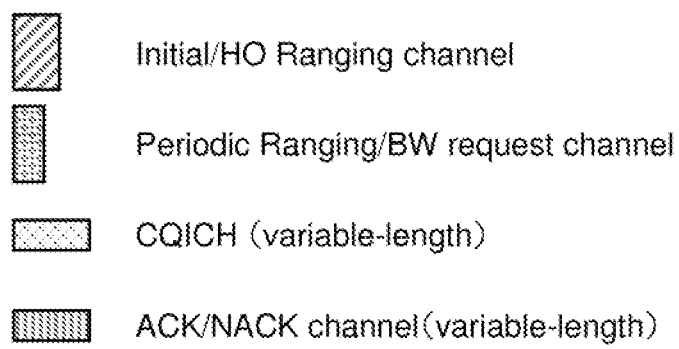

However, when base station 10 is allocated a 5-MHz bandwidth, it can use only 17 subchannels. On this account, one channel is insufficient, as shown in FIG. 3.

For the problem of subchannel insufficiency, for example, such a method can be considered in which a subchannel to be allocated to segments #1 and #2 is overlapped and this subchannel is shared between sectors #1 and #2. However, when this method is simply used, the problem of interference arises between sectors #1 and #2.

Then, in this embodiment, against the problem of subchannel insufficiency, when UL control unit 13 of base station 10 allows sectors #1 and #2 to share a subchannel, for example, it is to allocate this subchannel to segments #1 and #2, according to time division.

Consequently, although the same subchannel is used between sectors #1 and #2, the interference problem between sectors #1 and #2 is avoided because the time period for use is different.

Here, a specific embodiment of the channel allocation operation will be described with reference to FIG. 6 when base station 10 is allocated a 5-MHz bandwidth for a frequency bandwidth. Further, in FIG. 6, a subchannel is to be shared between sectors #1 and #2. Furthermore, in FIG. 6, the CQICH and ACK/NACK channel are omitted.

Figure 6:
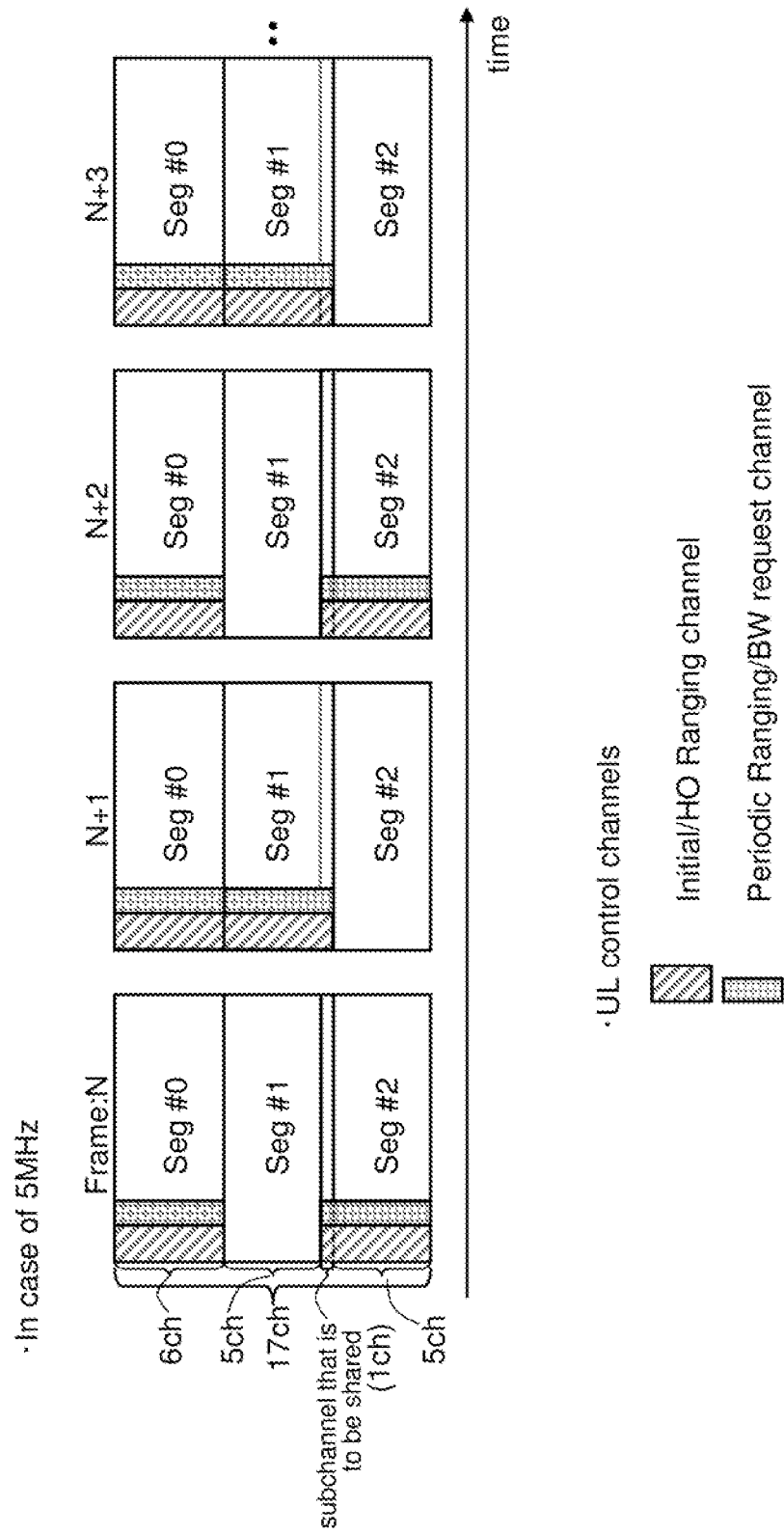
FIG. 6 is a diagram illustrative of a frame structure for an uplink subframe when the base station having a three-sector configuration is allocated a frequency bandwidth of 5 MHz in the wireless communication system shown in FIG. 4.

As shown in FIG. 6, UL control unit 13 of base station 10 distributes 17 subchannels usable by this station; it allocates six subchannels to segment #0, five subchannels to each of segments #1 and #2 in a fixed manner, and one subchannel to be shared between sectors #1 and #2 to segments #1 and #2, according to time division.

For example, in the Nth uplink subframe, one subchannel to be shared is allocated to segment #2. Consequently, because six subchannels are reserved for segment #2, six subchannels can be allocated for the ranging channel and the data channel. On the other hand, because only five fixed subchannels are reserved for segment #1, these five subchannels are all allocated for the data channel.

Further, in the subsequent N+1st uplink subframe, one subchannel to be shared is now allocated to segment #1. Accordingly, because six subchannels are reserved for segment #1, six subchannels can be allocated for the ranging channel and the data channel. On the other hand, because only five fixed subchannels are reserved for segment #2, these five subchannels are all allocated for the data channel.

After that, in the N+2nd uplink subframe, similar to the Nth uplink subframe, one subchannel to be shared is allocated to segment #2, whereas in the N+3rd uplink subframe, similar to the N+1st uplink subframe, one subchannel to be shared is allocated to segment #1. These allocations are repeated in further subsequent subframes.

As described above, in the embodiment, when base station 10 allows two sectors #1 and #2, for example, to share a subchannel, it allocates this subchannel to sectors #1 and #2, according to time division.

Consequently, the problem of subchannel insufficiency between terminals 20-1 and 20-2 positioned in sectors #1 and #2, respectively, can be avoided by sharing the same subchannel between these terminals in the uplink subframe. Further, because the time periods for use are different even though the same subchannel is used in the uplink subframe, the occurrence of the interference between sectors #1 and #2 can be suppressed.

Furthermore, in the embodiment, when base station 10 allows two sectors #1 and #2, for example, to share a subchannel, it allocates all of the subchannels allocated in a fixed manner for the data channel to sector #1 and #2 in the event that this subchannel is not allocated thereto.

Consequently, because the ratio of the UL control channels occupied is decreased in the entire uplink subframes, an improved throughput can be expected.

In addition, in the embodiment, the exemplary embodiment is described in which segments #1 and #2 are alternately, in turn, allocated the shared subchannel. However, there is no restriction to this. For example, the allocation frequency can be set higher to the segment having a larger number of users, or the allocation frequency can be set higher to the segment having a larger data volume based on the measurement of data volumes.

Also, in the embodiment, the exemplary embodiment is described in which segment #0 has six subchannels fixed, and segments #1 and #2 properly use five subchannels and six subchannels. However, there is no restriction to this. For example, as shown in Table 1, the segments can, in turn, share a subchannel with no subchannels fixed to them.

TABLE 1

|       | Frame: N | N + 1 | N + 2 | N + 3 | N + 4 | N + 5 | ... |
|-------|----------|-------|-------|-------|-------|-------|-----|
| Seg#0 | 6ch      | 6ch   | 5ch   | 6ch   | 6ch   | 5ch   | ... |
| Seg#1 | 5ch      | 6ch   | 6ch   | 5ch   | 6ch   | 6ch   | ... |
| Seg#2 | 6ch      | 5ch   | 6ch   | 6ch   | 5ch   | 6ch   | ... |

In addition, in the example shown in Table 1, the first five subchannels of 35 subchannels are subchannels to be exclusively used for segment #0, the subsequent one subchannel is a subchannel to be shared between segments #0 and #1, the following five subchannels are subchannels to be exclusively used for segment #1, the next one subchannel is a subchannel to be shared between segments #1 and #2, and the following five subchannels are subchannels to be exclusively used for segment #2.

However, also in the event of constructing such a configuration in which individual segments in turn share a subchannel, the allocation frequency can be changed depending on the number of users or on data volumes, not sequentially allocating the shared subchannel to the individual segments as shown in Table 1.

Further, in the embodiment, the exemplary embodiment is described in which one subchannel is to be shared. However, two or more subchannels can be shared. In this case, for example, two or more subchannels can be shared between sectors #0 and #1 or between sectors #1 and #2. One or more subchannels can be shared between sectors #0 and #1 or between sectors #1 and #2. This configuration can coop with such an event in which the number of subchannels might be further insufficient.

Furthermore, the methods carried out in base station 10 according to the present invention may be adapted for a program to be executed by a computer. Also, this program can be stored in a storage medium, or can be externally provided via a network.

As discussed above, the present invention has been explained with reference to the embodiment. However, the present invention is not limited to the above-mentioned embodiment. The configuration and details of the present invention can be modified variously within the scope that a skilled person can appreciate.

The invention claimed is:

1. A wireless communication system comprising:
a terminal; and
a base station for forming a plurality of sectors and receiving an uplink subframe from said terminal positioned in any of said plurality of sectors, according to an OFDMA and TDD scheme, wherein in said uplink subframe:
said base station allocates a predetermined subchannel among subchannels usable by said base station to two predetermined sectors among said plurality of sectors, according to time division,
said base station distributes and allocates subchannels other than said predetermined subchannel among subchannels usable by said base station to said plurality of sectors in a fixed manner, and
said base station allocates all of the subchannels allocated in the fixed manner as a data channel to said two predetermined sectors, when not allocating said predetermined subchannel thereto.

2. The wireless communication system according to claim 1, wherein in said uplink subframe, said base station allocates said predetermined subchannel as an uplink control channel and a data channel to said two predetermined sectors.

3. A base station for forming a plurality of sectors and receiving an uplink subframe from a terminal positioned in any of said plurality of sectors according to an OFDMA and TDD scheme, the base station comprising:
a controller that allocates a predetermined subchannel among subchannels usable by said base station to two predetermined sectors among said plurality of sectors in said uplink subframe, according to time division, wherein:

said controller distributes and allocates subchannels other than said predetermined subchannel among subchannels usable by said base station to said plurality of sectors in a fixed manner, and said controller allocates all of the subchannels allocated in the fixed manner as a data channel to said two predetermined sectors, when not allocating said predetermined subchannel thereto.

4. The base station according to claim 3, wherein in said uplink subframe, said controller allocates said predetermined subchannel as an uplink control channel and a data channel to said two predetermined sectors.

5. A channel allocation method performed by a base station for forming a plurality of sectors and receiving an uplink subframe from a terminal positioned in any of said plurality of sectors according to an OFDMA and TDD scheme, the method comprising the step of:

allocating a predetermined subchannel among subchannels usable by said base station to two predetermined sectors among said plurality of sectors in said uplink subframe, according to time division, wherein:

in said uplink subframe, subchannels other than said predetermined subchannel among subchannels usable by said base station are distributed and allocated to said plurality of sectors in a fixed manner, and all of the subchannels allocated in the fixed manner are allocated as a data channel to said two predetermined sectors, when said predetermined subchannel is not allocated thereto.

6. The channel allocation method according to claim 5, wherein in said allocating step, in said uplink subframe, said predetermined subchannel is allocated as an uplink control channel and a data channel to said two predetermined sectors.

\* \* \* \* \*